W. E. WINE.
LADDER.
APPLICATION FILED OCT. 12, 1914.
Reissued Feb. 23, 1915.
13,887.
2 SHEETS—SHEET 1.
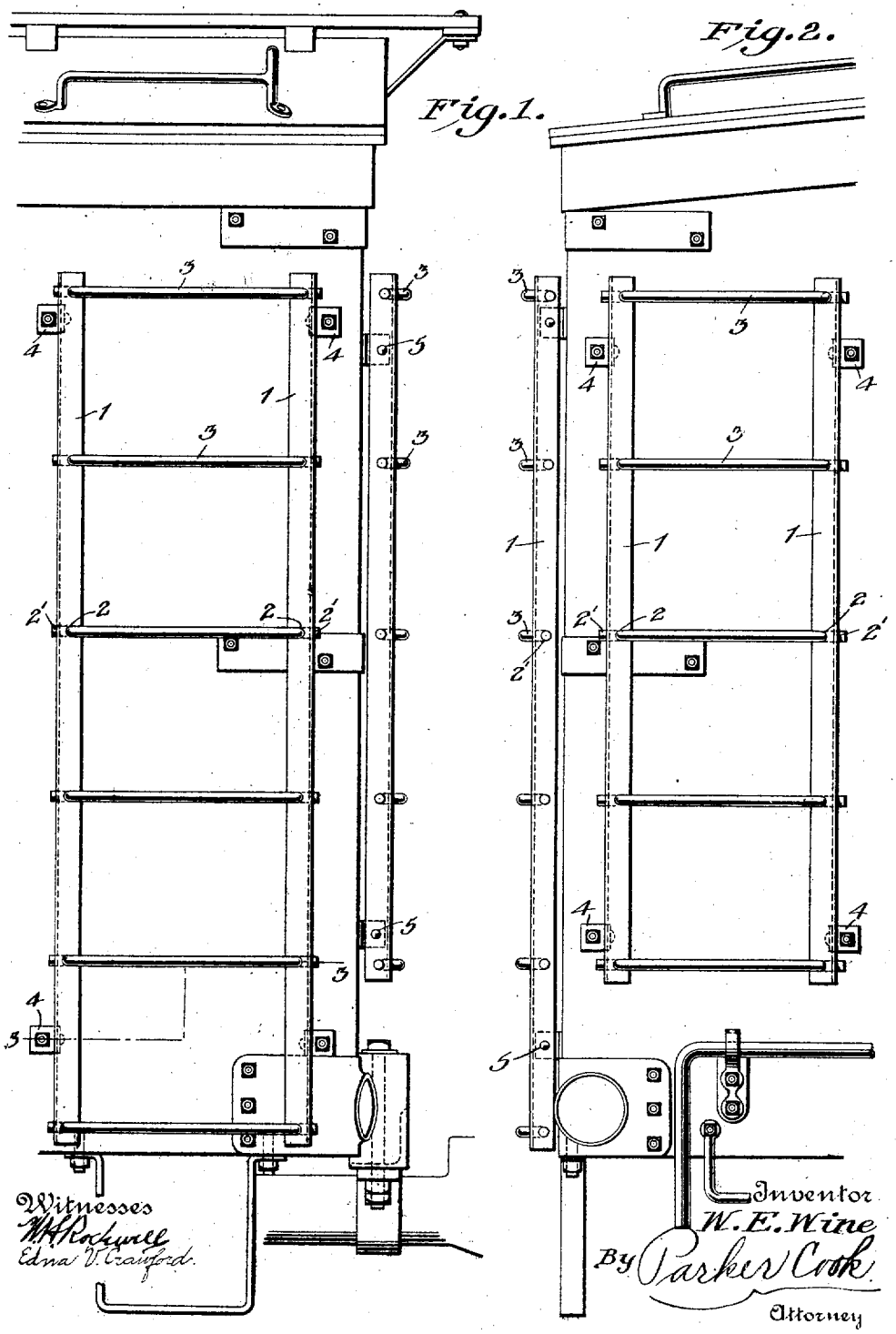

W. E. WINE.

LADDER.

APPLICATION FILED OCT. 12, 1914.

Reissued Feb. 23, 1915.

13,887.

2 SHEETS—SHEET 2.

Witnesses
W. H. Rochwell
Edna V. Crawford

Inventor
W. E. Wine
By Parker Cook
Attorney.

UNITED STATES PATENT OFFICE.

WILLIAM E. WINE, OF TOLEDO, OHIO, ASSIGNOR TO THE WINE RAILWAY APPLIANCE COMPANY, A CORPORATION OF OHIO.

LADDER.

13,887. Specification of Reissued Letters Patent. Reissued Feb. 23, 1915.

Original No. 1,040,083, dated October 1, 1912, Serial No. 658,436. Application for reissue filed October 12, 1914. Serial No. 866,416.

*To all whom it may concern:*

Be it known that I, WILLIAM E. WINE, a citizen of the United States, residing at Toledo, in the county of Lucas and State of Ohio, have invented new and useful Improvements in Ladders, of which the following is a specification, reference being had to the accompanying drawings, forming a part hereof.

My invention relates to ladders in general but more especially to those used on freight cars.

Ladders in general use on freight cars comprise stiles of wood or metal to which the rungs are bolted or riveted, or the rungs are bolted direct to the car. Where wooden stiles are used and where the rungs are bolted direct to the car the bolts frequently work loose caused by shrinkage of the wood and vibrations of the car body. Where the rungs are riveted to or upset into metal stiles the expense of construction becomes quite an item.

Therefore the object of my invention is to so construct the stiles and rungs of a ladder that they may be assembled without the use of either bolts or rivets.

A further object of my invention is to produce a ladder that will not fall apart or the rungs become disconnected from the stiles in case of accident to the car.

A further object of my invention is to produce a ladder which can be built and applied at a minimum cost.

With these and other objects hereinafter explained in view my invention consists in the construction and combination of elements hereinafter described and claimed.

Figure 5:
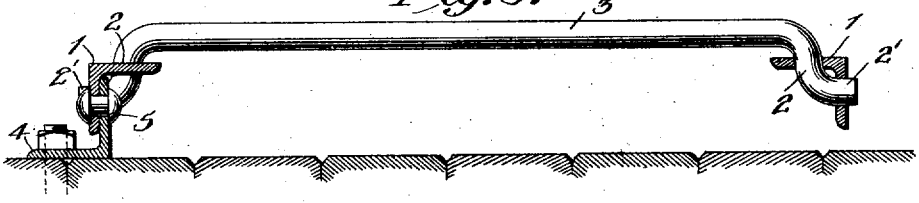
Figure 4:
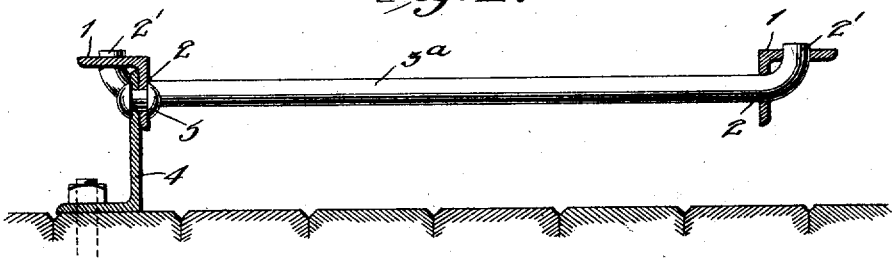
Figure 3:
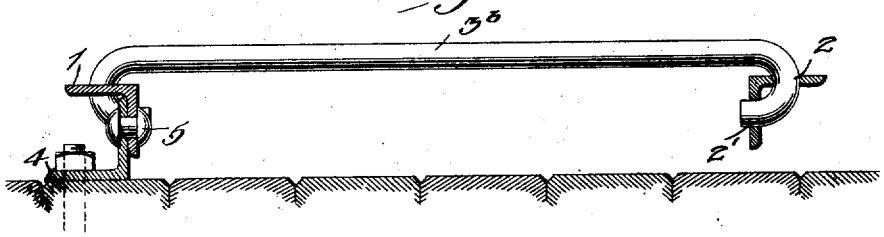
Figure 6:
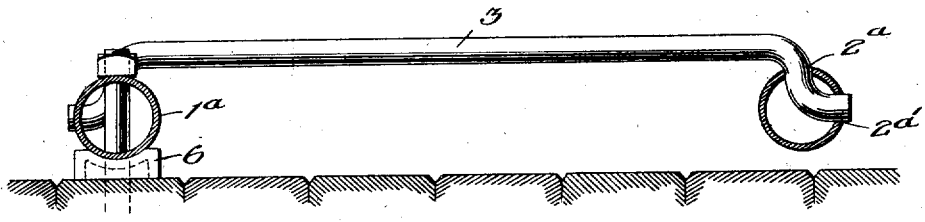

In the accompanying drawings which illustrate the preferred embodiment of my invention; Figure 1 is a side elevation of a portion of a car showing ladders applied to both the side and end of a car. Fig. 2 is an end elevation of same. Fig. 3 is a section of the ladder on line 3—3. Fig. 4 corresponds to section on line 3—3 showing a modified form of my invention. Fig. 5 is a section showing a modification of my invention. Fig. 6 is a section of still another modification of my invention.

Similar characters designate similar parts throughout the several figures of the drawings.

Referring now to the parts by number, the angle iron ladder stiles are denoted by 1 which are provided with two rows of holes 2 and 2′ substantially at right angles into which are inserted the specially formed rungs 3.

4 are angle iron brackets for bolting the ladder to the car end and are secured to the stiles by rivets 5.

In Fig. 3 is shown the preferred form of rung but it is obvious that a number of shapes for the end of the rungs can be made to fulfil the requirements, some of which are shown in Figs. 4 and 5.

In Fig. 6 is shown a tubular stile $1^a$ with holes $2^a$ and $2^{a\prime}$ in relatively the same position as those shown in Fig. 3. With this form of stile the ladder is held to the car by bolting through the stile and is spaced from the car body by brackets 6. It will also be noted that all forms of rungs applicable to the angle iron stile are equally applicable to this stile.

In order to apply rungs to the stiles or the stiles to the rungs the ends of the rungs are inserted in holes 2 and the rungs or stiles revolved through an angle of ninety degrees until the ends of the rungs project through holes 2′, into the position shown in the various figures of the drawings.

Instead of angle irons any of the standard rolled sections may be used namely, channels, Z's, T's, etc.

It will be understood from this description that although the improvements of this invention are simple they accomplish in a thoroughly practical manner all the objects sought and that by their employment danger of accidents hitherto arising from detached rungs is prevented. Furthermore repairs may readily be made and the separation of the rungs from the stiles be positively prevented so long as the ladder remains bolted to the car.

It will of course be understood that I do not desire to be limited to the specific construction or arrangement of elements shown and described, as it is obvious that changes in construction and arrangement may be made without departing from the spirit of the invention.

Having thus described my invention, I aim in the appended claims to cover all modifications which do not involve a departure from its spirit and scope.

What I claim as new and desire to secure by Letters Patent of the United States is:—

1. A ladder having stiles whose cross section provides divergent wall portions and having holes through such wall portions, the axes of which holes are at an angle to each other and rungs engaged in the holes.

2. In a ladder, angle bar stiles, each stile provided with holes in each flange and arranged in pairs, each pair comprising one hole in each flange and rungs with their ends each engaged in a pair of holes.

3. In a ladder, comprising stiles and detachable rungs, each stile provided with two series of holes with their axes at an angle to each other and arranged in pairs, each pair consisting of one hole in each series, each rung having offset ends engaged in one pair of holes in each stile.

4. In a ladder, comprising stiles provided with two series of holes with their axes at an angle to each other and arranged in pairs, each pair consisting of one hole in each series and rungs each having ends turned at an angle to the main portion and engaged in one pair of holes in each stile.

5. A ladder having stiles whose cross section provides divergent wall portions and having holes through such wall portions, the axes of which holes are at an angle to each other and rungs having ends deflected from the line of but parallel with the main portion and engaged in the holes.

6. A ladder comprising stiles with angularly disposed walls, one wall of each stile provided with openings, and rungs having their ends passing through the said openings and deflected to engage the other adjacent wall.

7. A ladder comprising stiles with angularly disposed walls one wall of each stile provided with openings and the other wall provided with seats therein and rungs passing through the stile openings and having the ends bent to engage the seats in the adjacent wall.

8. A ladder comprising stiles with angularly disposed walls, rungs having their ends passing through one of the walls of each of the stiles and free to rotate therein, and contacting with the other wall of each of the stiles and thereby held against rotation.

9. A car iron comprising members with angularly disposed walls, one wall of each member provided with an opening and a rung having its ends passing through the said opening and deflected to engage the other adjacent wall.

10. A ladder comprising in part a stile with angularly disposed walls, one wall provided with an opening and a rung having an end passing through the said opening and deflected to engage the other wall.

This specification signed and witnessed this 28th day of September 1914.

WILLIAM E. WINE.

In the presence of—

W. F. Cremlair,

Frank E. Browning.